United States Patent [19]

Maucher et al.

[11] 4,367,703

[45] Jan. 11, 1983

[54] APPARATUS FOR ENGAGING AND DISENGAGING DISCRETE CRANKSHAFTS IN INTERNAL COMBUSTION ENGINES

[75] Inventors: Paul Maucher, Sasbach; Oswald Friedmann, Lichtenau, both of Fed. Rep. of Germany

[73] Assignee: Luk Lamellen und Kupplungsbau GmbH, Bühl, Fed. Rep. of Germany

[21] Appl. No.: 233,959

[22] Filed: Feb. 12, 1981

[30] Foreign Application Priority Data

Feb. 13, 1980 [DE] Fed. Rep. of Germany ....... 3005345

[51] Int. Cl.³ .............................................. F02B 75/18
[52] U.S. Cl. ............................... 123/198 F; 123/52 A
[58] Field of Search ........................... 123/52 A, 198 F

[56] References Cited

U.S. PATENT DOCUMENTS 4,069,803 1/1978 Cataldo ........................... 123/198 F

FOREIGN PATENT DOCUMENTS 2828298 1/1980 Fed. Rep. of Germany ... 123/198 F

Primary Examiner—Tony M. Argenbright
Attorney, Agent, or Firm—Kontler, Grimes & Battersby

[57] ABSTRACT

An internal combustion engine with two crankshafts which are parallel to each other and are installed in a common casing. One of the crankshafts is driven whenever the engine is running and the other crankshaft is driven only when the engine is operated at maximum load. Prior to starting of the cylinders which rotate the other crankshaft, the other crankshaft is gradually accelerated to the speed of the one crankshaft by a friction clutch which is coaxial with the one crankshaft. Once the acceleration of the other crankshaft to the speed of the one crankshaft is completed, and the other crankshaft assumes a predetermined angular position with reference to the one crankshaft, the friction clutch is disengaged and such disengagement entails activation of a positive-engagement clutch between the two crankshafts. The friction clutch can constitute a component part of or it can be integrated into the positive-engagement clutch.

26 Claims, 2 Drawing Figures

APPARATUS FOR ENGAGING AND DISENGAGING DISCRETE CRANKSHAFTS IN INTERNAL COMBUSTION ENGINES

CROSS-REFERENCE TO RELATED CASES

An apparatus which serves the same purpose as the apparatus of the present invention is disclosed in our commonly owned copending application Ser. No. 233,960 filed Feb. 12, 1981 for "Internal combustion engine with separable crankshafts".

An apparatus which can be incorporated in or combined with the apparatus of the present invention is disclosed in the commonly owned copending application Ser. No. 233,952 filed Feb. 12, 1981 by Lothar Huber et al. for "Apparatus for establishing and terminating connections between crankshafts".

BACKGROUND OF THE INVENTION

The present invention relates to internal combustion engines in general, and more particularly to improvements in internal combustion engines of the type wherein discrete crankshafts can be rotated by discrete groups of cylinders. This results in considerable savings in fuel and reduces the percentage of deleterious combustion products which are discharged into the atmosphere. As a rule, a single group of cylinders will be used when the engine is operated at partial load, and one or more additional groups of cylinders are used when the engine is to operate at a higher or at a maximum load. Such engines must be equipped with means for connecting the crankshaft of a second section or unit in the engine to the crankshaft of a first section or unit before the cylinders of the second group are started. Connection of the two crankshafts to each other must be preceded by acceleration of the crankshaft in the second section to the speed of the crankshaft in the first section.

An internal combustion engine with several sections or units each of which embodies a discrete crankshaft is disclosed in German Offenlegungsschrift No. 28 28 298. The cylinders are are installed in a common block and a first group of such cylinders is in use when the engine is started and also whenever the engine operates at partial load. One or more additional groups of cylinders are set in operation if the engine is to furnish more power, and this entails a requisite acceleration of corresponding crankshaft or crankshafts for the cylinders in the additional group or groups. It is necessary to accelerate a previously idle crankshaft to the speed of the rotating crankshaft or crankshafts as well as to ensure that the accelerated crankshaft will be coupled to the running crankshaft or crankshafts in a predetermined angular position so as to guarantee the firing of cylinders in a desired sequence.

OBJECTS AND SUMMARY OF THE INVENTION

An object of the invention is to provide a novel and improved internal combustion engine with several crankshafts wherein the crankshafts can be connected to or disconnected from each other in a novel and improved way.

Another object of the invention is to provide a novel and improved apparatus which can be used in an internal combustion engine of the above outlined character to allow for predictable coupling of discrete crankshafts to or disconnection of discrete crankshafts from each other under optimum circumstances as regards the sequence of operation of the cylinders and/or the angular velocities of the crankshafts.

A further object of the invention is to provide the apparatus with novel and improved clutch means which can establish a torque transmitting connection between several crankshafts in a simple and automatic way.

An additional object of the invention is to provide a compact apparatus which can be readily installed in or on the casing or cylinder block of an internal combustion engine.

Another object of the invention is to provide the apparatus with novel and improved accelerating means for ensuring rapid and predictable acceleration of a previously idle crankshaft to the RPM of a rotating crankshaft.

An additional object of the invention is to provide the apparatus with novel and improved means for monitoring the angular velocities of crankshafts in an internal combustion engine of the above outlined character.

A further object of the invention is to provide the apparatus with novel and improved means for preventing positive engagement between discrete crankshafts until and unless the accelerated crankshaft is rotated at a speed which at least approximates the speed of the accelerating crankshaft and until and unless the accelerated crankshaft assumes a predetermined angular position relative to the accelerating crankshaft.

The invention is embodied in an internal combustion engine which comprises a first engine section or unit having a normally rotating crankshaft (this crankshaft can receive motion from a first group of cylinders), a second engine section or unit having a second crankshaft which is parallel to the first crankshaft and can receive motion from a second group of cylinders, means for accelerating the second crankshaft to the speed of the first crankshaft (the second crankshaft should be accelerated to a speed which at least closely approximates the speed of the first crankshaft), and clutch means which is operable to separably couple the crankshafts to each other upon completed acceleration of the second crankshaft.

The engine preferably further comprises a first camshaft, a gear train or other suitable means for rotating the first camshaft in response to rotation of the first crankshaft, a second camshaft (which may be coaxial with the first camshaft and parellel with the crankshafts), and means (e.g., a gear train) for rotating the second crankshaft in response to rotation of the second camshaft (before the second crankshaft begins to receive motion from the respective group of cylinders).

The engine preferably further comprises means for preventing direct connection of the second crankshaft to the first crankshaft save in a predetermined angular position of the second crankshaft with respect to the first crankshaft.

In accordance with a presently preferred embodiment of the invention, the accelerating means comprises a friction clutch and the aforementioned clutch means comprises a positive-engagement clutch which can connect the second crankshaft to the first crankshaft without any slippage between such crankshafts. In accordance with a more specific feature of the presently preferred embodiment, the friction clutch comprises component parts which may constitute component parts of the positive-engagement clutch. Both clutches can be installed in such a way that they are coaxial with one of the crankshafts, e.g., with the first crankshaft which is to accelerate the second crankshaft. The latter then receives torque from the friction clutch and thereafter from the positive-engagement clutch by way of a gear train or the like.

The friction clutch preferably comprises means for automatically engaging or activating the positive-engagement clutch upon completed acceleration of the second crankshaft to the angular velocity of the first crankshaft, and such means for automatically engaging may comprise means (e.g., a pump) for monitoring the angular velocities of the two crankshafts (or of the two camshafts if the friction clutch is installed between first and second camshafts which are respectively driven by and drive the corresponding crankshafts). The friction clutch is designed in such a way that it automatically ceases to accelerate the second crankshaft when the angular velocity of the second crankshaft matches that of the first crankshaft, i.e., the friction clutch includes means for accelerating the second crankshaft only as long as the monitoring means detects a difference between the angular velocities of the two crankshafts.

The novel features which are considered as characteristic of the invention are set forth in particular in the appended claims. The improved engine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
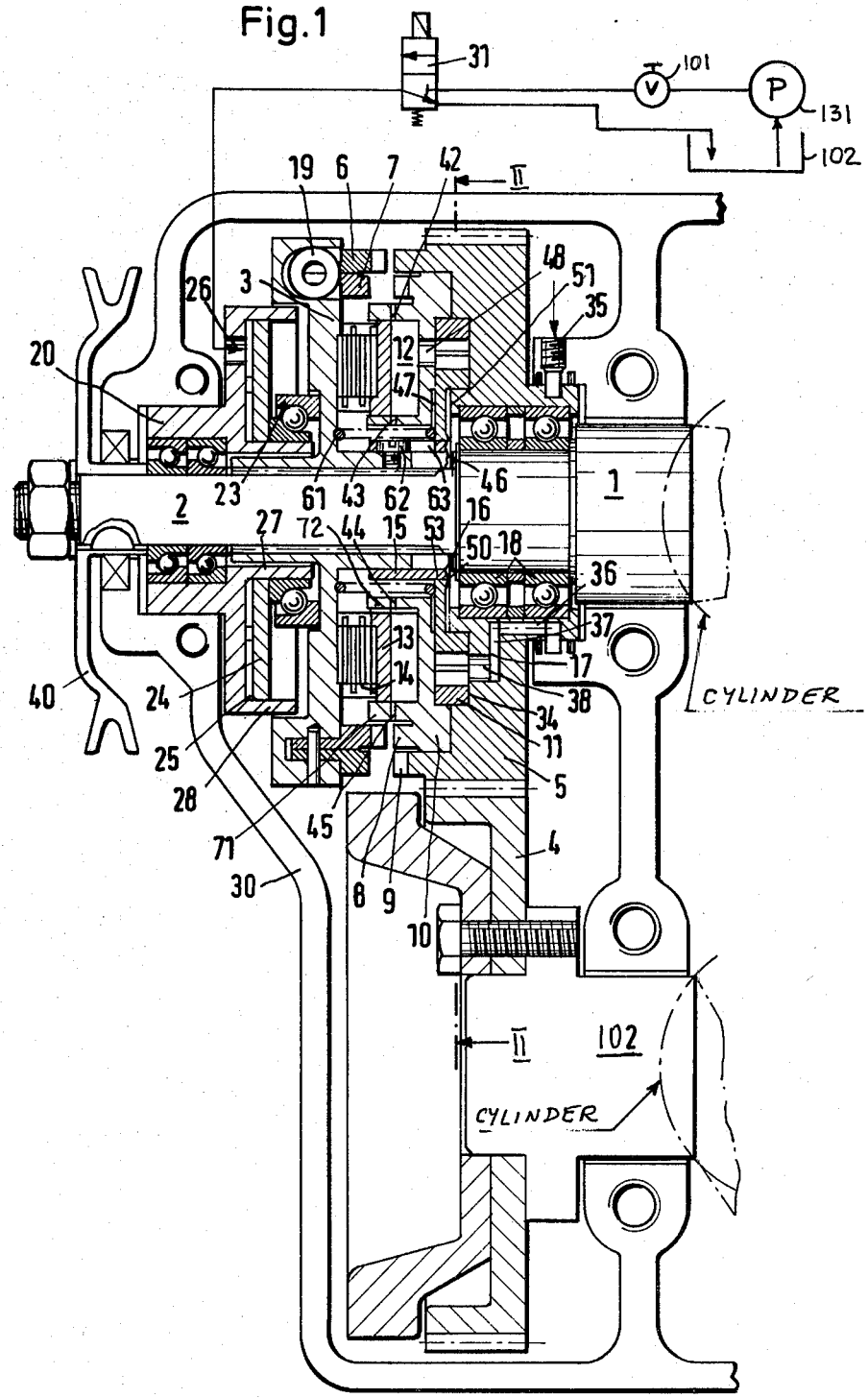
FIG. 1 is a fragmentary sectional view of an internal combustion engine which embodies one form of the invention and wherein the two clutches are coaxial with the first crankshaft.

FIG. 1 illustrates a portion of a cylinder block 30 forming part of an internal combustion engine which comprises two parallel crankshafts 1 and 102. The upper crankshaft 1 forms part of a first section or unit of the engine, and the lower crankshaft 102 forms part of a second section or unit. It is assumed that the crankshaft 1 is driven by the respective cylinders (only one indicated by a broken line) as soon as the engine is started as well as whenever the engine is operated at partial load. The crankshaft 102 can be rotated by the respective cylinders (only one indicated by a broken line) only after it has been accelerated to the angular velocity of the crankshaft 1.

The means for accelerating the second crankshaft 102 to the angular velocity of the first crankshaft 1 comprises a clutch including a first clutch member 3 which is non-rotatably secured to the end portion 2 of the upper crankshaft 1. The clutch further comprises a second clutch member 5 which is coaxial with the clutch member 3. The clutch member 5 is freely rotatable about the axis of the upper crankshaft 1 when the clutch is disengaged. To this end, the clutch member 5 is mounted on a twin antifriction bearing 18 which surrounds the adjacent portion of the crankshaft 1. It will be noted that the mounting of the clutch member 5 does not allow for any axial movements relative to the crankshaft 1.

The first clutch member 3 is movable axially of the crankshaft 1 toward and away from the second clutch member 5. In the illustrated embodiment, the clutch member 3 is movable axially by an annular piston 24 which can displace the clutch member 3 through the medium of an antifriction bearing 23. The inner race of the bearing 23 is engaged by the piston 24 and need not rotate; on the other hand, the outer race of the bearing 23 bears against and can rotate with the first clutch member 3. The piston 24 is moved in a direction to the right, as viewed in FIG. 1, in response to admission of oil or another suitable hydraulic fluid into an annular chamber 25 which surrounds the left-hand end portion 2 of the upper crankshaft 1. The chamber 25 has an inlet port 26 which can receive pressurized hydraulic fluid from a source 131 by way of a solenoid-operated valve 31. The source 131 may constitute the oil pump of the vehicle. The chamber 25 is defined by two concentric annular projections or ribs 27 and 28 which constitute integral parts of a member 20 secured to or forming an integral part of the aforementioned cylinder block 30. If the member 20 is a separately produced component, the connection between this member and the cylinder block 30 is such that the chamber 25 cannot be shifted in the axial direction of the upper crankshaft 1.

The antifriction bearing 23 enables the piston 24 to move relative to the clutch member 3 and vice versa. The just described hydraulic actuating means for moving the clutch member 3 axially of the end portion 2 of the crankshaft 1 can be replaced with a mechanical actuating device, for example, with a lever which can be actuated by the operator of the vehicle. Furthermore, it is possible to utilize other hydraulic actuating means for moving the piston 24 axially of the crankshaft 1; for example, the hydraulic actuating means may comprise a conventional bellows, not shown.

The means for transmitting torque from the clutch member 3 to the clutch member 5 (which latter can drive the second crankshaft 102 through the medium of a gear 4) comprises a plunger 13 which is non-rotatably connected with the second clutch member 5 and a package of friction discs 14 which are interposed between the clutch member 3 and the plunger 13. The plunger 13 is preferably a ring which is installed in a chamber 12 defined by the clutch member 5. In order to establish a positive connection between the clutch members 3 and 5 (i.e., in order to ensure that the crankshaft 1 is positively coupled to the crankshaft 102), the plunger 13 must assume a predetermined axial position in which a profile 8, 9 of the clutch member 5 can positively engage a complementary profile 6, 7 of the clutch member 3. Each of the profiles 6, 7 and 8, 9 can comprise alternating teeth and tooth spaces and the arrangement may be such that the teeth spaces of the profile 8, 9 on the clutch member 5 only when the two clutch members assume predetermined angular positions relative to each other.

Figure 2:
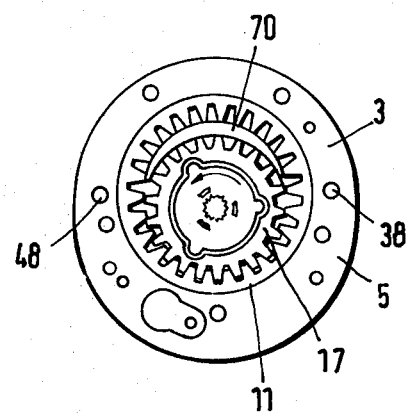
FIG. 2 is a fragmentary sectional view as seen in the direction of arrows from the line II—II of FIG. 1 and illustrates certain details of the presently preferred means for monitoring the angular velocities of the two crankshafts.

The plunger 13 can assume the aforementioned predetermined angular position (in which the profiles 6, 7 and 8, 9 can positively engage each other) in response to admission of pressurized hydraulic fluid into the chamber 12 by a monitoring device which comprises the angular velocities of the crankshafts 1 and 102 and allows the plunger 13 to assume the predetermined angular position only when the angular velocity of the crankshaft 102 matches or closely approximates the angular velocity of the crankshaft 1. In the illustrated embodiment, the monitoring means comprises an oil pump, preferably a so-called sickle or crescent type pump (also known as inside gear pump) which can supply oil or another suitable hydraulic fluid into the chamber 12 until the plunger 13 reaches the axial position which is illustrated in FIG. 1. At such time, hydraulic fluid which has been admitted into the chamber 12 can escape by way of liquid discharging openings or ports 42, 43, 44 and 45 which are machined into the axially extending walls 71, 72 of the chamber 12. An oil pump which can be used as a means for monitoring the angular velocities of the crankshafts 1 and 102 is described, for example, in the German publication entitled "Die Meisterprüfung im KFZ-Handwerk, Grundlagen Fahrwerk Otto-Motor 1, Auflage 1977". Reference may be had to page 392 of this German publication which describes a crescent type pump of the general class contemplated for use in the embodiment of FIG. 1. Certain details of this pump are shown in FIG. 2.

The pump includes a portion of the second clutch member 5 which was an end face facing toward the clutch member 3 and provided with a recess 34. This recess accomodates an outer pump wheel or gear 11, an eccentric inner pump wheel or gear 17 and a so-called crescent 70 which is shown in FIG. 2. The pump further comprises a cover or lid 10 which overlies the recess 34 in such a way that a portion (47) of the inner pump wheel 17 can extend toward the crankshaft 1 and out of the recess 34. The cover 10 is further formed with an opening 48 which establishes a connection between the chamber 12 and the outlet of the crescent-type pump. The path along which the crescent-type pump sucks hydraulic fluid into the chamber 12 when the angular velocity of the crankshaft 102 deviates from the angular velocity of the crankshaft 1 includes the channels 35, 36, 37 and the aforementioned opening 38. The path defined by the parts 35–38 enables the crescent-type pump to draw hydraulic fluid from the sump of the vehicle. As mentioned before, the crescent-type pump will draw fluid from the sump into the chamber 12 as long as the angular velocity of the crankshaft 102 is less than the angular velocity of the crankshaft 1. Otherwise stated, the crescent-type pump will operate to force hydraulic fluid into the chamber 12 as long as the angular velocity of the second clutch member 5 deviates from the angular velocity of the first clutch member 3. In order to prevent operation of the crescent-type pump when the engine is operated at partial load, the apparatus which is shown in the drawing further comprises a pusher or slide 15, an energy storing device here shown as coil spring 61, and a further spring 16. The pusher 15 is non-rotatably connected with the first clutch member 3 by a fastening device 62 which, in the illustrated embodiment, constitutes a simple screw. The head of the screw 62 extends into a slot 63 which is parallel to the axis of the crankshaft 1. This ensures that the pusher 15 can be moved in a direction toward the inner pump wheel 17 under the action of the coil spring 61 which reacts against the first clutch member 3 and bears against a stop 53 of the pusher 15. The extent of axial movement of the pusher 15 toward the pump wheel 17 is determined by the selected axial length of the slot 63.

When the first clutch member 3 moves axially toward the second clutch member 5, the pusher 15 follows such movement under the action of the coil spring 61 until the conical peripheral surface 50 of the pusher 15 engages a complementary conical surface of the inner pump wheel 17. Since the pusher 15 cannot rotate relative to the first clutch member 3, the inner pump wheel 17 begins to rotate in response to frictional engagement between the conical surfaces 50 and 51.

When the first clutch member 3 is moved axially of and away from the second clutch member 5, the spring 16 (which can constitute a dished spring) ensures that the conical surfaces 50 and 51 of the pusher 15 and the inner pump wheel 17 become disengaged from each other so that the crescent-type pump is deactivated. The spring 16 bears against a projection 46 of the crankshaft 1.

As mentioned above, the clutch member 3 can be moved into positive engagement with clutch member 5 in that the profile 8, 9 of the member 5 can be engaged by the complementary profile 6, 7 of the member 3. The two profiles ensure that the clutch members 3 and 5 can move into positive engagement with each other only when the clutch member 5 assumes a predetermined angular position with reference to the clutch member 3, i.e., when the second crankshaft 102 is held in a predetermined angular position with reference to the crankshaft 1 so as to ensure proper sequence of firing of the cylinders in the internal combustion engine.

In order to prevent abrupt engagement between the profiles 6, 7 and 8, 9 and the resulting potential damage to the clutch members 3 and 5, the apparatus of FIG. 1 preferably further comprises a shock absorber or damping means serving to absorb the impacts during the initial stage of movement of the profile 6, 7 into positive engagement with the profile 8, 9 of the second clutch member 5 which is held against axial movement relative to the crankshaft 1. In the illustrated embodiment, the shock absorber comprises a coil spring 19 which is interposed between two relatively movable portions of the first clutch member 3. This clutch member comprises an inner portion which is driven by the crankshaft 1 and an outer portion which is rotatable relative to the inner portion and carries the profile 6, 7. The shock absorber 19 enables the second portion of the clutch member 3 to move relative to the first or inner portion through a predetermined angle so as to enable the profile 6, 7 to find its way into proper engagement with the complementary profile 8, 9 of the clutch member 5.

It is clear that the shock absorber 19 (or a discrete second shock absorber) can be installed between two relatively movable portions of the second clutch member 5. In such modified construction, the clutch member 5 will comprise a first portion which meshes with the gear 4 on the crankshaft 102 and a discrete second portion which rotates relative to the first portion and bears the profile 8, 9. The shock absorber is then installed between the two portions of the clutch member 5. Other types of shock absorber means can be used with equal advantage.

The left-hand end of the portion 2 of the upper crankshaft 1 extends from the cylinder block or casing 30 and is connected with a pulley 40 or an analogous rotary member which can drive one or more auxiliary apparatus, such as the light generator, water pump and/or cooling fan of the vehicle.

Referring again to FIG. 2, the crescent 70 of the crescent-type pump is installed between the outer pump wheel 11 and the inner pump wheel 17 and is fixed to and thus rotates with the clutch member 3. When the pump is in operation, the inner pump wheel 11 and the outer pump wheel 17 rotate in the same direction, for example, in a counterclockwise direction, as viewed in FIG. 2. If the rotational speed of the inner pump wheel 11 deviates from the rotational speed of the clutch member 3 and crescent 70, the pump conveys hydraulic fluid from the inlet port 38 to the outlet port or opening 48. As soon as the difference between the angular velocities of the inner pump wheel 17 and the clutch member 3 (which drives the crescent 70) is reduced to or approximates zero, the pump ceases to force the hydraulic fluid to flow from the inlet port 38 to the outlet port 48.

The operation of the engine embodying the structure shown in FIGS. 1 and 2 is as follows.

It is assumed that the engine is operated at partial load so that the cylinders of the first group rotate the crankshaft 1 while the second crankshaft 102 is idle and the clutch between the crankshafts 1 and 102 is disengaged. If the operator desires to operate the engine at full load, it is necessary to accelerate the crankshaft 102 to the exact speed of the crankshaft 1 and to positively couple the two crankshafts to each other. To this end, the operator opens a valve 100 in the conduit 101 which connects the oil pump 131 with the valve 31 so that the valve 31 admits pressured hydraulic fluid into the chamber 25 via port 26. This causes the piston 24 to move in a direction to the right, as viewed in FIG. 1, and the antifriction bearing 23 is urged against the clutch member 3 whereby the clutch member 3 moves axially of the crankshaft 1 and toward the second clutch member 5. Consequently, the pusher 15, which is connected with the clutch member 3 in the aforedescribed manner, starts the crescent-type pump which begins to deliver pressurized hydraulic fluid into the chamber 12 because the angular velocity of the crankshaft 1 exceeds the angular velocity of the crankshaft 102. As the chamber 12 receives pressurized hydraulic fluid, the plunger 13 moves in a direction toward the first clutch member 3 and thereby exposes the outlets or discharge openings (limiting means) 42-45 before the profile 6, 7 of the clutch member 3 engages the profile 8, 9 of the clutch member 5. In such axial position of the plunger 13, the clutch member 3 drives the clutch member 5 through the medium of the friction discs 14. Consequently, the second crankshaft 102 is accelerated so that its angular velocity ultimately reaches or closely approximates the angular velocity of the crankshaft 1. At such time, the crescent-type pump ceases to supply fluid into the chamber 12 so that the piston 13 begins to move with the first clutch member 3, and with the friction discs 14 which are interposed between the clutch member 3 and the plunger 13, in a direction to move the plunger 13 deeper into the chamber 12. At the same time, the friction discs 14 continue to rotate the plunger 13 because the clutch member 3 rotates with the crankshaft 1. The axial movement of the plunger 13 is terminated when the axial profile 6, 7 of the clutch member 3 fully engages the profile 8, 9 of the clutch member 5.

If the operator desires to disengage the second crankshaft 102 from the first crankshaft 1, the valve 31 is actuated in such a way that it ceases to supply oil from the pump 131 into the chamber 25. Consequently, the spring 61 which reacts against the clutch member 5 through the medium of the pusher 15 and the inner pump wheel 17 and bears against the clutch member 3 causes the clutch member 3 to move away from the clutch member 5 so that the profile 6, 7 is disengaged from the profile 8, 9. The fluid which has filled the chamber 25 is expelled from the chamber 25 into the sump 102 by way of the port 26 and valve 31.

When the clutch member 3 moves away from the clutch member 5 during disengagement of the second crankshaft 102 from the first crankshaft 1, this entails an increase in the distance between the abutment 53 of the pusher 15 and the first clutch member 3 so that the bias of the coil spring 61 upon the abutment 53 of the pusher 15 is reduced. Therefore, and when such spring bias is reduced to a predetermined value, the dished spring 16 which acts in the opposite direction prevails and disengages the conical surfaces 50 and 51 from each other. This terminates the transmission of torque from the clutch member 3 to the pump wheel 17.

In accordance with a modification of the invention, the accelerating clutch can be installed between first and second camshafts which are respectively driven by the crankshafts 1 and 102. Also, the accelerating clutch can be mounted on one of the two camshafts so as to rotate the other camshaft (or to be rotated by the other camshaft) when the operator of the vehicle desires to accelerate the crankshaft 102 to the angular velocity of the crankshaft 1. The accelerating clutch is gradually engaged while the positive-engagement clutch between the two crankshafts is disengaged, and the positive-engagement clutch is engaged when the RPM of the accelerated camshaft matches or closely approximates the RPM of the accelerating camshaft. Furthermore, the positive-engagement clutch can establish a direct driving connection between the two crankshafts only when the driven camshaft assumes a predetermined angular position relative to the accelerating camshaft, i.e., when the crankshaft 102 assumes a predetermined angular position relative to the crankshaft 1. The means for transmitting torque between the crankshafts and the corresponding camshafts may comprise suitable gear trains, preferably gear trains with a ration of two-to-one, i.e., the camshaft performs a single revolution while the associated crankshaft completes two revolutions. The just described modification (which is not specifically shown in the drawing but is illustrated in the aforementioned commonly owned copending applications to which reference may be had, if necessary) is especially desirable in a four-stroke cycle engine because it ensures proper sequence of operation of the cylinders.

An important advantage of the improved engine is that the crankshafts 1 and 102 are parallel to each other. This is desirable and advantageous because, when all of the cylinders are in use, torsional stresses upon the crankshafts 1 and 102 are not as pronounced as in an engine wherein the crankshafts are disposed in series (reference may be had to the aforementioned German Offenlegungsschrift No. 28 28 298). Consequently, the crankshafts 1 and 102 in the engine of the present invention can be manufactured at a lower cost which contributes, quite significantly, to a reduction of the cost of the engine.

As explained above, the provision of discrete crankshafts for discrete units or sections of the engine renders it possible to save fuel as well as to reduce the quantity of deleterious combustion products whenever the circumstances warrant the operation of engine at less than maximum load. Thus, the operator of the vehicle can select the number of cylinders which are to receive fuel and hence the number of active sections or units.

The mounting of both crankshafts (and preferably also of the associated camshafts) in a common casing or block (30) contributes to simplicity, lower cost and compactness of the engine.

The crescent-type pump which is shown in FIG. 2 and which can be used as a means for monitoring and/or comparing the angular velocities of the crankshafts 1 and 102 is available on the market. This, too, contributes to a reduction of the overall cost of the engine because there is no need to design specially constructed means for the monitoring of RPM of the crankshafts 1 and 102 preparatory to establishment of a positive torque-transmitting connection between such parts. The illustrated monitoring pump is very flat, as considered in the axial direction of the crankshaft 1, and its radial dimensions are also small, so that it occupies little room in the interior of the casing 30. Wear upon the pump which is shown in FIG. 2 is reduced and the useful life of such pump is prolonged owing to the provision of the pusher 15 which ensures that the pump is idle when the crankshaft 102 is disconnected from crankshaft 1, i.e., when the operator of the engine does not intend or desire to couple the crankshafts 1 and 102 to each other.

The plunger 13 prevents positive engagement between the clutch member 3 and 5 as long as the pump of FIG. 2 delivers fluid into the chamber 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In an internal combustion engine, the combination of a first engine section having a normally rotating first crankshaft; a second engine section having a second crankshaft parallel to said first crankshaft; means for accelerating said second crankshaft to the speed of said first crankshaft; and clutch means operable to separably couple said crankshafts upon completed acceleration of said second crankshaft.

2. The combination of claim 1, further comprising a first camshaft; means for rotating said first camshaft in response to rotation of said first crankshaft; a second camshaft; and means for rotating said second camshaft in response to rotation of said second crankshaft, said camshafts being parallel to said crankshafts; and a common casing for said shafts.

3. The combination of claim 1, further comprising means for preventing the engagement of said clutch means save in a predetermined angular position of said second crankshaft with reference to said first crankshaft.

4. The combination of claim 1, wherein said accelerating means includes a friction clutch and said clutch means includes a positive-engagement clutch.

5. The combination of claim 4, wherein said friction clutch includes means for automatically activating said positive-engagement clutch upon completed acceleration of said second crankshaft and in a predetermined angular position of said second crankshaft with reference to said first crankshaft.

6. The combination of claim 5, wherein said means for automatically activating said positive-engagement clutch includes means for monitoring the angular velocities of said crankshafts.

7. The combination of claim 6, wherein said friction clutch includes means for accelerating said second crankshaft as long as said monitoring means continues to detect a difference between the angular velocities of said crankshafts.

8. The combination of claim 6, wherein said monitoring means comprises a pump for a hydraulic fluid.

9. The combination of claim 8, wherein said positive-engagement clutch comprises first and second clutch members the first of which is movable toward and away from the second thereof, said friction clutch comprising means defining a chamber for hydraulic fluid, a plunger reciprocable in said chamber and connected for rotation with said second clutch member, said plunger being movable axially of said first clutch member and said first and second clutch members respectively rotating with said first and second crankshafts, said pump being arranged to admit hydraulic fluid into said chamber as long as the angular velocity of said first crankshaft exceeds the angular velocity of said second crankshaft whereby said plunger receives torque from said first clutch member to thereby accelerate said second crankshaft via said second clutch member.

10. The combination of claim 9, wherein said pump is a crescent type pump having an outlet connected with said chamber and a suction inlet connected with a source of hydraulic fluid.

11. The combination of claim 10, wherein said pump includes an eccentric gear and means for transmitting torque from said first crankshaft to said gear.

12. The combination of claim 11, wherein said means for transmitting torque from said first crankshaft to said gear comprises a pusher non-rotatably connected with said first clutch member and movable axially of said first crankshaft into and from torque transmitting engagement with said gear.

13. The combination of claim 12, further comprising means for yieldably biasing said pusher against said gear.

14. The combination of claim 13, wherein said biasing means comprises a spring reacting against said first clutch member and bearing against said pusher.

15. The combination of claim 13, wherein said gear and said pusher have complementary surfaces which frictionally engage each other in response to axial movement of said first clutch member toward said second clutch member.

16. The combination of claim 12, further comprising means for yieldably biasing said pusher away from said gear.

17. The combination of claim 1, further comprising means for moving said first clutch member axially of said one crankshaft and toward said second clutch member and said friction clutch further comprises friction generating means interposed between said plunger and said first clutch member so that said first clutch member rotates said second clutch member through the medium of said plunger and said friction generating means.

18. The combination of claim 17, further comprising means for limiting the extent of movement of said first clutch member toward said second clutch member during acceleration of said second crankshaft to the speed of said first crankshaft so that said first and second clutch members are incapable of moving into actual engagement with each other until and unless the acceleration of said second crankshaft is completed.

19. The combination of claim 18, wherein said means which defines said chamber has at least one opening which allows fluid supplied by said pump to escape from said chamber before said plunger is moved to a position in which said first clutch member can engage said second clutch member, said opening constituting said limiting means.

20. The combination of claim 1, wherein said clutch means comprises a positive-engagement clutch having complementary first and second profiles for establishment of a positive torque-transmitting connection between said crankshafts in response to completed acceleration of said second crankshaft.

21. The combination of claim 1, wherein said clutch means further comprises first and second clutch members which are respectively provided with said first and second profiles and are respectively rotatable with said first and second crankshafts, one of said clutch members being movable axially toward the other clutch member to thereby connect said profiles with each other in response to completed acceleration of said second crankshaft.

22. The combination of claim 20, wherein one of said profiles is rotatable relative to the corresponding crankshaft through a predetermined angle and further comprising shock absorber means interposed between said one profile and the respective crankshaft.

23. The combination of claim 21, wherein said shock absorber means comprises at least one spring.

24. The combination of claim 1, further comprising first and second camshafts, means for transmitting torque between said first camshaft and said first crankshaft, and means for transmitting torque between said second camshaft and said second crankshaft, said clutch means being interposed between said crankshafts and including a positive-engagement clutch, said accelerating means being interposed between said camshafts and including a friction clutch.

25. The combination of claim 24, further comprising means for monitoring the speeds of said camshafts and for effecting engagement of said positive-engagement clutch in response to acceleration of said second camshaft to the speed of said first camshaft.

26. The combination of claim 24, further comprising means for preventing activation of said positive-engagement clutch except in a predetermined angular position of said second crankshaft relative to said first crankshaft.

* * * * *